United States Patent
Greenfield et al.

(10) Patent No.: US 7,565,883 B2
(45) Date of Patent: Jul. 28, 2009

(54) CALCAREOUS ORGANISM GROWTH ACCELERATOR

(76) Inventors: Richard M. Greenfield, 5309 S. Indian River Dr., Ft. Pierce, FL (US) 34982;
Betsey G. Moore, 5643 Indian River Dr., Ft. Pierce, FL (US) 34982

( * ) Notice: Subject to any disclaimer, the term of this patent is extended or adjusted under 35 U.S.C. 154(b) by 48 days.

(21) Appl. No.: 11/399,991

(22) Filed: Apr. 7, 2006

(65) Prior Publication Data
US 2007/0289546 A1    Dec. 20, 2007

(51) Int. Cl.
*A01K 63/04* (2006.01)
*A01K 61/00* (2006.01)
*C02F 3/34* (2006.01)

(52) U.S. Cl. ............... 119/268; 119/221; 119/231; 435/262

(58) Field of Classification Search ........... 119/215, 119/231, 243, 268; 435/243, 260
See application file for complete search history.

(56) References Cited

U.S. PATENT DOCUMENTS 3,623,455 A * 11/1971 Kelley et al. ............ 119/231
6,376,229 B2 * 4/2002 Morris et al. ............ 435/260
6,939,708 B2   9/2005 Morris et al.
2004/0065266 A1 * 4/2004 Fernandez ............ 119/221

FOREIGN PATENT DOCUMENTS

DE   WO9831633   * 7/1998
EP   1 604 955 A2   12/2005

OTHER PUBLICATIONS www.kentmarine.com Tech-CB Parts A&B Wayback Apr. 3, 2004 2 pages www.kentmarine.com/saltwater/buffers/techcb-parts-a-b.htm 4 pages.*
Kent Marine, Turbo-Calcium and Liquid Reactor, http://www.kentmarine.com/saltwater/tc.html, accessed Nov. 8, 2005.

* cited by examiner

*Primary Examiner*—Michael R Mansen
*Assistant Examiner*—Monica L Williams
(74) *Attorney, Agent, or Firm*—McHale & Slavin, P.A.

(57) ABSTRACT

The purpose of this invention is to provide compositions useful for promoting the growth of calcareous organisms present in a closed system aquatic habitat. Particularly, to composition capable of efficiently delivering calcium and carbonate to the calcareous organisms. Most particularly, to a composition effective for enhanced delivery of aragonite to a closed system aquatic habitat where it dissociates into bio-available supplements, such as, calcium, strontium, magnesium, and carbonate ions, whereby enhanced growth of the calcareous organisms is achieved.

4 Claims, No Drawings

CALCAREOUS ORGANISM GROWTH ACCELERATOR

FIELD OF THE INVENTION

This invention relates to a composition useful for promoting the growth of calcareous organisms present in a closed system aquatic habitat; particularly, to a composition capable of efficiently delivering calcium and carbonate to the calcareous organisms; most particularly, to a composition effective for enhanced delivery of aragonite to a closed system aquatic habitat where it dissociates into bioavailable supplements, such as, calcium, strontium, magnesium, and carbonate ions, whereby enhanced growth of the calcareous organisms is achieved.

BACKGROUND OF THE INVENTION

Saltwater aquariums have been popular for many years for both novice and expert aquarists alike. The typical aquarium contains a diverse mix of marine life, including, tropical fish, aquatic plants, and calcareous organisms. Calcareous organisms are calcium carbonate based organisms which include corals, coralline algae, and shelled animals (snails, hard tube worms and clams). Calcium and carbonate (alkalinity) are the major constituents of calcareous organisms, thus, these organisms require adequate supplies of these substances in their environment to flourish.

One of the most frustrating aspects for many aquarists is maintaining adequate and consistent levels of those marine supplements necessary for the growth of calcareous organisms. Some of these supplements include, for example, calcium, carbonate, iodine, strontium, and magnesium, to name a few. Unlike the ocean, which has a relatively infinite supply of these supplements, the aquarium is a closed system, hence, the growth and multiplication of calcareous organisms leads to depletion of those supplements, and they must be continuously replenished by the aquarist.

An example of some particularly beneficial and attractive calcareous organisms includes coralline algae. Coralline algae are a type of encrusting algae found throughout the aquatic world and include various species, e.g., red, pink, purple, etc. These organisms must be introduced into the closed aquatic system. The growth and proliferation of these colorful organisms in aquariums are especially desirable for both aesthetic and practical reasons. It is often the standard by which the success of a particular aquarium is judged.

Coralline algae are comprised of an organic portion common to all algae and a calcium carbonate skeleton unique to this type of algae. As with all algae, the organic portion of these organisms grow at the rate determined by the availability of plant nutrients (fertilizers) and light. However, as with all calcareous organisms, successful propagation depends on the availability and effective delivery of calcium and carbonate to these organisms.

Coralline algae supplant and suppress the proliferation of green algae, hair algae and other unsightly or harmful algae commonly encountered in the marine aquarium. In addition, coralline algae assist in preparing or "seeding" rock surfaces for the colonization of living corals and other sessile invertebrates. Under the proper conditions, the bright and vivid colors of coralline algae will produce new colonies and spread, thereby, providing enhanced visual interest to the aquarium frequently sought after by advanced aquarists.

Aragonite is a naturally occurring mineral that is secreted by the coral organisms that make reef/skeleton structures in the ocean. Aragonite is an isomer of calcium carbonate ($CaCO_3$) with minor inclusions of strontium and magnesium, plus other trace elements. When dissolved in an Aqueous solution, aragonite readily dissociates, forming, inter alia, calcium and carbonate ions. Aragonite is not only highly soluble in seawater but remains soluble despite the presence of dissolved orthophophates, which hinder, and finally prevent the dissolution of other forms of calcium carbonate, such as calcite.

Experienced aquarists have long recognized the numerous benefits of having aragonite-containing substrates at the bottom their aquariums (i.e., deep or shallow sand bed). A sand bed containing aragonite is a natural and passive way to support the calcium and carbonate levels while buffering pH through the dissolution of aragonite in the closed system. However, because aragonite has a half-life of about 18 to 24 months, the accumulation of detritus at the bottom, and constant subtraction of magnesium from the system by the growth of coralline algae, the addition of more aragonite-containing substrate in the aquarium is necessary.

Calcite is a less soluble isomer form of calcium carbonate that is often used in sand beds or as an additive to supplement low calcium and carbonate levels in aquariums. Calcite does not readily dissolve at the pH of marine aquariums (i.e., above 8.0). This means that calcite does not impart any significant benefits (buffers/alkalinity) into the aqueous solution until the pH falls to a level that is inherently dangerous for most marine life. Moreover, calcite can be precipitated at much lower pH than aragonite and is only held in solution in normal sea water by the presence of magnesium ions. The tendency of calcite to co-precipitate magnesium can make it unpredictable in the closed system aquarium. Coralline algae require magnesium to flourish, therefore, removing magnesium from the environment will inhibit the growth of coralline algae.

There are numerous individually packaged calcium and carbonate (alkalinity) boosting products commercially available. These products are currently sold in two separate containers to ensure the calcium ions and carbonate ions are separated to prevent them from forming crystals prior to use. Additions of these separate products in stoichiometrically correct proportions require the user to combine these products separately following a precise recipe. If the dosing protocol of each product is not strictly followed, the result can be harmful or stressful to the closed aquatic system.

Thus, the present invention satisfies a long felt need for a prepackaged stable composition that upon addition into a closed aquatic system will effectively and efficiently deliver the necessary dose of calcium and carbonate ions needed to promote the growth of calcareous organisms without the need to follow a complex multi-product recipe, while maintaining proper pH in range of normal sea water, i.e., about 8.0 to about 8.5. Moreover, since the instant composition specifically targets calcareous organisms having a calcium carbonate skeleton, it is not a fertilizer, and therefore does not inadvertently promote the growth of nuisance algae (green, hair, etc.)

SUMMARY OF THE INVENTION

The purpose of this invention is to provide a stable composition for promoting the growth of calcareous organisms, in particular, coralline algae, present in a closed aquatic system.

The first major component of the inventive composition is aragonite particles having a particle size capable of being evenly dispersed throughout the aquatic environment of the closed system. The aragonite particles dissociate in the aquatic environment, thereby delivering supplements to the calcareous organisms for enhanced growth.

The second major component of the composition is dissociated calcium ions derived from a calcium containing compound. Addition of calcium ions to the aquatic system immediately raises the dissolved calcium levels in the aquatic system. The increased concentration of dissociated calcium in the surrounding aquatic environment essentially prevents diffusion of dissolved calcium in the calcareous organism (supplied mostly by the aragonite component) back into the aquatic environment.

Accordingly, it is an objective of the instant invention to provide herein a single prepackaged composition capable of being added directly to a closed aquatic system to supply most nutrients necessary for successful growth of most calcareous organisms.

It is yet another objective of the present invention to provide aragonite having a particle size which allows it to readily disperse throughout the closed aquatic system and accelerate the rate of chemical reaction with calcareous organisms (e.g., diffusion) by providing more surface area.

Another objective of the composition of the present invention is to provide at least one additional component, such as an iodide ion containing compound, necessary for calcareous organisms.

Other objects and advantages of this invention will become apparent from the following description which set forth, by way of example, certain embodiments of this invention.

DEFINITIONS

The following list defines terms and phrases used throughout the specification. Although the terms and phrases are listed in a singular tense the definitions are intended to encompass all grammatical forms.

As recited herein, the term "aquatic system" refers to a saltwater system similar to that of natural seawater, that is, having a pH of about 8.0 to about 8.5, carbonate hardness level (alkalinity) between about 2.0 to about 3.5 milliequivalents per liter (meq/L), and calcium levels between about 350 to about 500 ppm.

As recited herein, the term "bioavailable" refers to the ability of a nutrient or supplement to absorb and become available at the site of physiological activity of an organism.

As recited herein, the phrase, "calcareous organisms" refers to all calcium carbonate based organisms which include corals, coralline algae, and shelled organisms (snails, hard tube worms, mollusks, clams and the like).

As recited herein, the term "biofilm" refers to an immobilized matrix of cells that cover all submerged objects and surfaces inside the closed aqueous system. The matrix is produced and inhabited by microorganisms which carry out certain biochemical processes, such as dissociating aragonite particles into bioavailable components, including, albeit not limited to, calcium and carbonate ions. The biofilm provides a calcium and carbonate rich layer proximate to the calcareous organism for absorption into calcareous organism as needed.

The biofilm is also responsible for turning toxic nitrogenous compounds and ammonia, which accumulate in the closed system of the aquarium as a result of decaying food and organic compounds, into less harmful nitrates used by the plants and algae for food.

DETAILED DESCRIPTION OF THE INVENTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

The instant invention promotes the growth of calcareous organisms using a prepackaged and stable composition comprising, inter alia, aragonite and at least one calcium ion containing compound, to replace the typical multi-product recipe.

The first component of the instant composition includes aragonite (orthorhombric $CaCO_3$) particles having a size capable of dispersing evenly throughout the aquatic system. Moreover, the size of the aragonite particles should be such that these particles readily diffuse into any biofilm covering the calcareous organisms. The biofilm helps to dissociate the aragonite into its bioavailable nutrients (i.e., calcium, carbonate, strontium and magnesium.) It has been discovered by the present inventor that aragonite particle size should be in the colloidal size range, that is, at least about 10 microns, preferably about 5 microns to exhibit the aforementioned properties.

The micron dimension of the aragonite is advantageous as it provides 500× the surface area of a 1 mm particle, and therefore, accelerates the rate of chemical reactions that are surface area dependent, such as, diffusion through a biofilm.

The second component of the instant invention includes at least one calcium ion containing compound. Examples of idoneous calcium ion containing compounds include at least one member selected from the group consisting of calcium chloride, calcium hydroxide, calcium citrate, calcium sucrate, calcium lactate, calcium EDTA (ethylenediaminetetraacetic acid), and calcium gluconate. Calcium chloride is a particularly preferred form of calcium ion containing compound since it is very soluble in aquatic systems, thus, able to deliver high amounts of calcium ions to a closed system without affecting pH. In this example, the spectator ion is the chloride ion. Chloride is one of the primary ionic components of natural aquatic systems (sea water) and excess of chloride ions may raise the salinity of the closed system but does not create any ionic imbalance.

The instant invention may further include a third component, for example, least one iodide ion containing compound capable of supplying one or more iodide species (including iodate and molecular iodine forms) to the aquatic system. In many calcareous organisms iodine acts as a detoxifier, providing protection against ultra-violet radiation and a natural defense against parasites. Examples of suitable iodide containing compounds include, albeit not limited to, sodium iodide, potassium iodide. Potassium iodide is a particularly preferred form of an iodide ion containing compound as the spectator ion (potassium) also promotes coralline algae and coral growth.

Another example of an idoneous supplement that may be included in the instant composition includes, at least one magnesium ion containing compound capable of supplying magnesium to the aquatic system. Examples of suitable magnesium ion containing compounds include, albeit not limited to, magnesium sulfate, magnesium chloride or the like. Magnesium is an essential part of photosynthesis; without photosynthesis beneficial coralline algae and coral would not survive in closed system aquariums.

EXAMPLE

A non-limiting illustrative example is presented herein; the following is only an example and not solely representative of the inventive concepts discussed herein.

Into de-ionized water by weight, based on the total weight of the composition, the following dry components are added:

| | |
|---|---|
| Aragonite ($CaCO_3$) | from about 50 to about 54%; |
| Calcium Chloride ($CaCl_2$) | from about 49 to about 46%; |
| Potassium Iodide (KI) | less than 1%; |

When using the prepackaged composition of the present invention, the user will need only shake the container well to reconstitute before use, and add approximately 5 ml per 50 gallons of closed aquatic system.

Without wishing to be bound to any particular theory, it is believed that when the aforementioned composition is within the prepackaged container, the second component (for example, calcium chloride) is fully dissociated into ionic calcium and non-active incidental ions of chloride. The concentration of ionic calcium is present in an amount effective to prevent the aragonite from dissociating inside the container.

After the appropriate portion (e.g., about 5 ml per 50 gallons of closed system) of this composition is added to the aquatic system, the aragonite particles begin to immediately dissociate into bioavailable nutrients (calcium cations and carbonate anions) which are readily absorbed by any calcareous animals therein. Concomitantly, the second component is supplied in an amount effective such that the concentration of dissociated calcium ions in the aquatic system precludes, or retards, the diffusion of absorbed calcium through the membrane of the calcareous organisms into the aquatic system. The higher concentration of absorbed ionic calcium in the calcareous organisms would diffuse to the aquatic system was it not for the ionic calcium of the second component. Thus, the two components of the present invention ensure that the concentrated calcium and carbonate are effectively delivered to the calcareous organisms.

In established aquatic systems a biolayer will cover all calcareous organisms therein. The dispersed aragonite particles adhere upon and/or embed within this biolayer. The biolayer facilitates the dissociation of the aragonite particles into the bioavailable calcium and carbonate ions for absorption into calcareous organisms as needed. The concentration of calcium and carbonate in the biofilm provides a nutrient-rich reserve from which the calcareous organisms draw from.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A composition useful for effectively providing calcium and carbonate ions to calcareous organisms for enhanced growth within a closed aquatic system, said composition comprising:
    a first dry component consisting essentially of aragonite particles provided in amounts between about 50% to about 54% by weight based on the total weight of the dry components, said aragonite particles having a size effective for dissociating into bioavailable calcium cations and bioavailable carbonate anions;
    a second dry component including calcium chloride provided in amounts between about 49% to about 46% by weight, based on the total weight of the dry components, said calcium chloride useful to control said dissociation of said aragonite; and
    de-ionized water;
    wherein, upon addition of said composition to said closed aquatic system said aragonite particles dissociate into said bioavailable calcium and carbonate ions for absorption into said calcareous organisms and said calcium chloride effectively precludes diffusion of absorbed calcium ions back to said aquatic system.

2. The composition as set forth in claim 1, wherein said aragonite particle size is at least about 10 microns.

3. The composition as set forth in claim 2, wherein said aragonite particle size is about 5 microns.

4. The composition of claim 1, further including:
    potassium iodide provided in amounts less than 1% by weight, based on the total weight of the composition.

* * * * *